May 6, 1958 H. SONNENSHEIN ET AL 2,833,654
FOOD PRODUCT AND METHOD AND APPARATUS FOR
MAKING THE PRODUCT
Filed Sept. 28, 1954 2 Sheets-Sheet 1
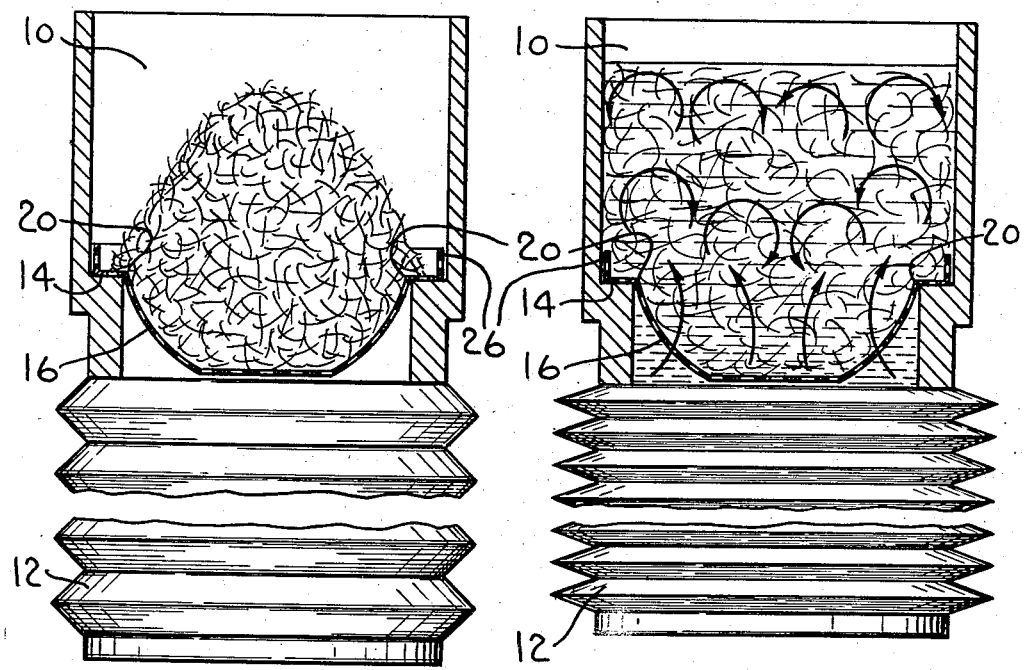
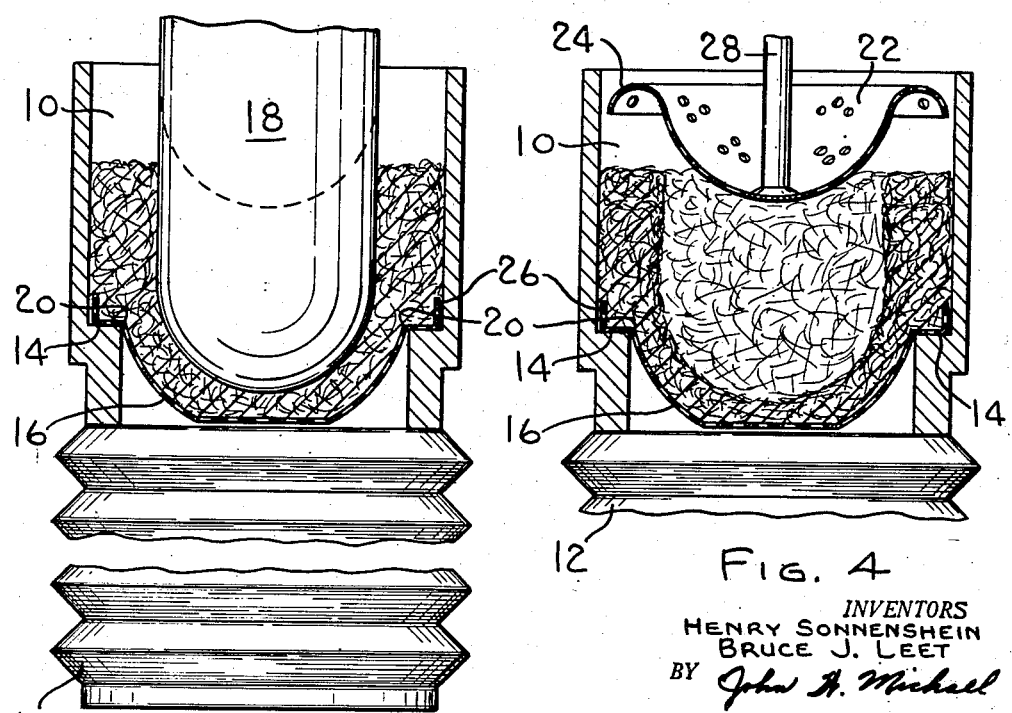
INVENTORS
HENRY SONNENSHEIN
BRUCE J. LEET
BY John H. Michael
ATTORNEY May 6, 1958  H. SONNENSHEIN ET AL  2,833,654
FOOD PRODUCT AND METHOD AND APPARATUS FOR
MAKING THE PRODUCT
Filed Sept. 28, 1954  2 Sheets-Sheet 2
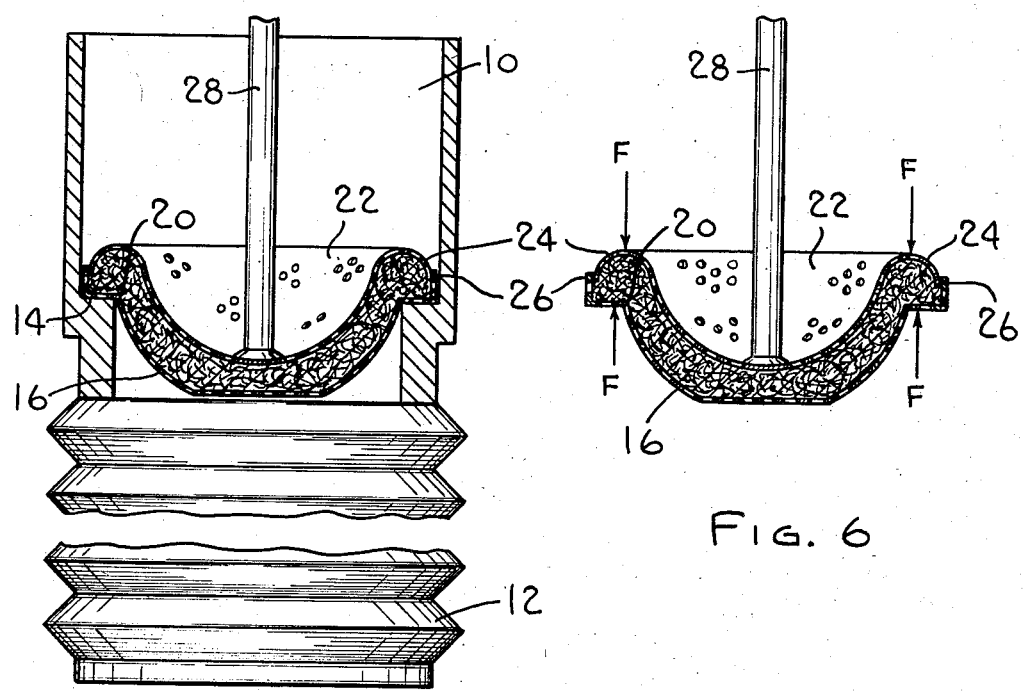
FIG. 5
FIG. 6
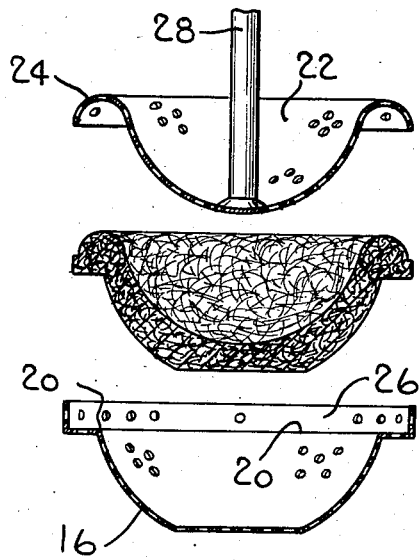
FIG. 7
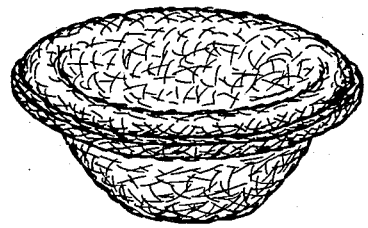
FIG 8
INVENTORS
HENRY SONNENSHEIN
BRUCE J. LEET
BY John N. Michael
ATTORNEY

2,833,654

FOOD PRODUCT AND METHOD AND APPARATUS FOR MAKING THE PRODUCT

Henry Sonnenshein and Bruce J. Leet, Milwaukee, Wis.

Application September 28, 1954, Serial No. 458,856

5 Claims. (Cl. 99—100)

This invention relates to a method and apparatus for making a food product. One food product produced by our method is a potato basket or nest which is sufficiently sturdy to be packaged and merchandised by modern methods.

Potato baskets or nests are used in serving various creamed dishes and the like and comprise an edible container for food which would otherwise flow over the surface of the plate. In addition to being functional and good to eat the nest makes the entire plate more attractive and appetizing. Potato baskets or nests are not new with us. They have heretofore been made by hand by forming a cup-like nest of de-starched potato shreds and then deep frying the nest. The only other method known to us employed a sieve-like member into which the shreds were pressed by hand and then held by means of a second sieve-like member during the frying process. In both methods the resulting product was extremely fragile and could not be packaged for normal merchandising. As a result, production has been limited to a very small quantity and the baskets have been merchandised only through bakeries and delicatessens. In use, breakage of the delicate baskets was considerable and the rim or edge frequently became so damaged as to lose all appetizing appearance.

The principal object of this invention is to provide a potato basket or nest which is sufficiently strong to be packaged and handled in the normal merchandising channels.

Another object is to provide a new method for making potato baskets or nests.

Still another object is to provide apparatus for making potato baskets or the like.

A further object is to provide a new potato basket or nest which is strong and attractive. This basket or nest is readily identifiable when compared to potato baskets or nests made by other methods.

Other objects and advantages will be pointed out in, or be apparent from, the specification and claims, as will obvious modifications of the single embodiment shown in the drawings in which:

Fig. 1 is a section view showing the first step in the process with shredded potatoes in the bowl-shaped mold positioned in the floatation chamber;

Fig. 2 shows water introduced to the chamber to agitate and float the shreds;

Fig. 3 shows the water drained out and the shreds formed between the mandrel and the mold;

Fig. 4 shows the start of the core towards the mold;

Fig. 5 shows the completion of the compression of the shreds;

Fig. 6 shows the core and mold held together during the frying process;

Fig. 7 shows the separation of the core and mold from the completed product; and Fig. 8 is a perspective view of the finished product.

Referring to the drawings in detail, it will be noted that we provide a floatation chamber 10 below which is a bellows 12. The chamber has a ledge 14 adapted to receive the peripheral edge of the bowl-shaped mold 16. The bellows assembly contains a quantity of water which may be forced up into the floatation chamber 10 by compressing the bellows. The water may be withdrawn from the floatation chamber by letting the bellows expand to allow the water to drain from the chamber. It will be appreciated that many structures operating on the general principle of forcing water into or withdrawing water from the chamber can be provided in lieu of the bellows. Indeed, it is appreciated that the structure herein illustrated is hardly that which would be employed in continuous commercial production of the food product. However, the structures illustrated do show the principle involved, and in this sense, are fully adequate for teaching the present invention. As will be more apparent hereinafter, the chamber wall might conveniently be horizontally split immediately adjacent the ledge 14 in order to permit easier access to the core and mold placed within the floatation chamber. Here again, while the illustrated structure could be improved upon for commercial purposes, the drawings do show a practical embodiment.

At the start of the process, the female bowl-shaped mold 16 is placed in chamber 10 on ledge 14, as shown in Fig. 1. It is to be noted that the mold is perforated to permit water to flow therethrough into the chamber or from the chamber back to the bellows. After the mold has been placed in the chamber, a measured quantity of shredded de-starched potatoes are placed in the mold. The bellows is now compressed to force water into the floatation chamber through the perforations in mold 16. The introduction of water in this manner agitates and floats the shreds quite uniformly throughout the volume filled by the water. While the shreds are floating and agitated, as shown in Fig. 2, a mandrel 18 is started into the chamber from above. When the mandrel reaches the position shown in dotted lines in Fig. 3, the bellows may be allowed to expand to start withdrawal of the water within the chamber. This will start shreds depositing on the mold. Shortly after the water has started draining from the mold, the mandrel is moved on down to the position shown in solid lines in Fig. 3. This forms the shreds rather uniformly along the bottom and curved sides of the mold and also causes the shreds not so deposited to be piled up adjacent the peripheral edge of the mold. Thus, Fig. 3 shows the manner in which the shreds pile up between the mandrel and the wall of chamber 10 to a much greater thickness than is found throughout the remainder of the deposited shredded potatoes. As noted above, the water is started draining from the floatation chamber prior to insertion of the mandrel to its full extent. This is done to insure an even deposit of shreds along the bottom and sides of the mold. If the water is not drained until after the mandrel reaches its full insertion position, the shreds can pile up at a point between the interior shoulder 20 of the mold 16 and the mandrel to bridge the space and prevent deposit of shreds uniformly throughout the bottom structure of the basket. After the water has been drained and the shreds deposited as illustrated in Fig. 3, the mandrel is withdrawn and the shreds hold their shape as seen in Fig. 4.

Fig. 4 also illustrates the manner in which the core 22 is now moved into the chamber from above. It will be noted that the majority of the core conforms pretty well with the shape of the mold. It should also be noted that the curved lip 24 is adapted to move down between the upstanding cylindrical wall portion 26 of the mold. Movement of the core into the mold, as illustrated in Fig. 5, causes considerable compression of the shred portions adjacent the periphery of the core and mold. This compaction of the shreds is quite important since it results in a strong edge which will resist breakage and thus permit the product to be packaged and handled through normal merchandising channels.

After the core has been moved towards the mold to its full extent, as illustrated in Fig. 5, both the core and mold are withdrawn from the chamber and are now moved to a deep fryer unit for the frying process. The shredded potatoes are retained in the molds and a force F is applied to the core and mold to keep the shreds under compression throughout the cooking process. The application of force F during the cooking process is illustrated in Fig. 6. Since the shredded potatoes contain some water which will immediately go into steam upon immersion of the shreds into the deep fryer, it is found advantageous to hold the shreds in the mold during the cooking process to prevent the steam generated from the moisture in the potatoes from loosening the shredded structure. The core and mold are not separated until they are removed from the fryer.

Upon removal from the fryer, the mold will readily fall off, but the potato basket tends to cling to the core. However, the basket can be readily freed from the core by merely vibrating the core through any suitable means. For example, the rod 28 fixed to the core 22 can be struck a light blow to induce a very slight vibration in core 22 to release the potato basket. It is contemplated that in a commercial structure, the inherent vibration of the machinery will provide sufficient vibration to make unnecessary any additional vibrating means.

Fig. 8 illustrates the final product and Fig. 7 gives a cross-section of the product. This potato basket possesses some remarkable characteristics not to be expected in such an item. The frying of the potato shreds between the two core and mold under pressure results in an apparent glazing of the individual shreds on the outside surfaces of the basket which makes them quite resistant to moisture. As a result, the potato basket does not become soggy when it is filled with creamed or other semi-liquid foods. To the contrary, the basket remains crisp and attractive and appetizing for many hours even though containing a rather liquid food. The potato shreds on the inside of the basket are not glazed, but have a porous texture which would readily absorb moisture if the glazed exterior allowed moisture to enter. Potato baskets produced by prior art methods are quite porous and absorb moisture rapidly.

Since the entire basket is made of potatoes which are so deposited as to have a quite uniform thickness throughout the bottom or bowl portion of the basket and due to the fact that the basket is compressed prior to and during cooking, the resulting product has remarkable strength. As mentioned above, potato baskets are not new, but those heretofore available were most delicate and fragile whereas the present basket is rather strong. The present basket may be handled without extreme caution and may be easily packaged in boxes for merchandising through the usual channels. In merchandising these items, they need not be accorded any special treatment over and above that accorded any bakery product.

Extensive investigation of the market for these baskets indicates that any such baskets heretofore available were sold in extremely limited quantities due to the fragile nature thereof. It should also be noted that there are very few localities in this country where potato baskets can be purchased. The entire limiting factor seems to have been the lack of strength suitable for merchandising in any kind of volume. Due to the low volume production of the baskets available, the cost is quite high whereas the present baskets can be readily produced at considerable reduction in the cost to the consumer.

It will be appreciated that in order to produce these baskets on a commercial scale, automatic machinery is indicated. This machinery is not new except for machinery involving the principles set out above. For the rest of the process, the machinery employed in manufacture of such fried items as potato chips and the like can be used. Briefly, this machinery involves an inspection conveyor which leads to a potato washer. After the potatoes are washed, they go into a potato peeler. On leaving the peeler, the potatoes are shredded and then washed to remove the starch. The starch removal is very efficient due to the fact that the potatoes are shredded and considerable surface area is open to action of the water. Following the de-starching of the potato shreds, the shreds are measured into the correct quantities and fed into the mold which may already be in place in the floatation chamber or may be delivered to the floatation chamber subsequently. Following the process within the flotation chamber, the core and mold are conveyed to the frying unit with pressure being applied to the core and mold to obtain the desired compression during the cooking operation. Following the frying operation, the baskets are drained, still in the core and mold. On leaving the draining chamber the core and mold are separated from the baskets and returned to the system while the baskets are conveyed to the packaging stage which can again involve automatic machinery.

The machinery for effecting our method is not particularly complicated and readily ties in with available machinery for the rest of the process. The molds can be "loaded" with the correct quantity of shredded potatoes before or after being placed in the floatation chamber. It will be appreciated that the mold can be placed in or taken from the floatation chamber easier if the chamber is horizontally split above the support ledge. The apparatus for injecting and draining the water can take many cores and molds. The conveyors to take the forms to the various operations are relatively standard.

From the above it will be apparent that the present process can be readily adapted to modern production and merchandising techniques. Our experimentation indicates that it is necessary to initially form the shreds during or immediately following floatation of the shreds. This is necessary in order to secure uniform distribution of the shreds. If a mandrel or core were forced into the mold with the shreds piled up as in Fig. 1, the results would be totally unsatisfactory. As indicated above, another step which is highly important is frying the potato basket while retained under pressure between the core and mold. This prevents disintegration or loosening of the potato basket during the cooking step and results in a product which is readily identified from similar products produced by other methods. The present basket has a hard compressed edge and all the outside surfaces are glazed. These identifying features are also highly desirable from a functional standpoint.

While the shredded food is referred to herein generally as potatoes, it will be understood that other foods may be used. Similarly, while the foods are referred to as "shredded" the term is used broadly to include such foods as noodles, for example, which in their natural condition are like shredded food and would work in this process.

Although but one embodiment of the present invention has been illustrated and described, it will be apparent to those skilled in the art that various changes and modifications may be made therein without departing from the spirit of the invention or from the scope of the appended claims.

I claim:

1. The method of making a potato basket comprising the steps of placing a given quantity of shredded potatoes in a bowl-shaped mold having a peripheral flange, forming the shreds generally uniformly over the inside surface of the mold with a substantially greater thickness over the flange, compressing the shreds in the mold with the greatest compression applied to the shreds over the flange, and frying the shreds while maintaining the compression thereon.

2. Apparatus for forming a food product comprising, means defining a floatation chamber, a perforated bowl-shaped mold having a peripheral flange, means for supporting the mold in the chamber, means for forcing water into the chamber to a level above the flange and for draining the water from the chamber, and a core conforming to the shape of the mold insertable into the mold having a peripheral flange.

3. Apparatus for forming a food product comprising, means including a wall defining a floatation chamber, a perforated bowl-shaped mold having a peripheral flange, means for supporting said mold in the chamber with the wall extending above the flange, means for forcing water into the chamber to a level above the flange and for draining water from the chamber, a mandrel insertable into the chamber to cooperate with the bowl-shaped portion of the mold in forming a food therebetween while being spaced from the wall to allow food to accumulate between the mandrel and the wall above the flange to a substantial height, and a core conforming to the shape of the mold having a peripheral flange insertable into the mold to compress the food between said mold and said core and the flanges thereon.

4. The method of making a potato basket comprising the steps of placing a given quantity of shredded potatoes in a bowl-shaped mold having a peripheral flange, introducing water to said mold to float and agitate the shreds therein, applying a compressive force to said shreds centrally of said mold to uniformly compress said shreds over the inside surface of the bowl-shaped portion of said mold and to build up the thickness of the shreds over the flange, draining the water from said mold simultaneously with the application of said compressive force, compressing the shreds over the flange, and frying the shreds while maintaining the compression thereon.

5. The method of making a potato basket according to claim 4 in which the compressive force applied to the shreds over the flange is greater than that applied to the other shreds in the mold.

References Cited in the file of this patent

UNITED STATES PATENTS

| | | |
|---|---|---|
| 695,907 | Buckingham | Mar. 25, 1902 |
| 2,156,145 | Cavett et al. | Apr. 25, 1939 |
| 2,619,050 | Forbes | Nov. 25, 1952 |

FOREIGN PATENTS

| | | |
|---|---|---|
| 677,322 | Great Britain | Aug. 13, 1952 |

OTHER REFERENCES

"Food Engineering," June 1952, pages 131 and 133, article entitled "Novel Foods."

"The Joy of Cooking," 1953, by I. S. Rombauer et al., published by the Bobbs-Merrill Company, Inc., New York, page 98, article entitled "Noodle Baskets," and page 302, article entitled "Potato Baskets."